July 7, 1931. A. K. KOSUNEN 1,813,498
CUTTING TOOL
Filed June 27, 1929
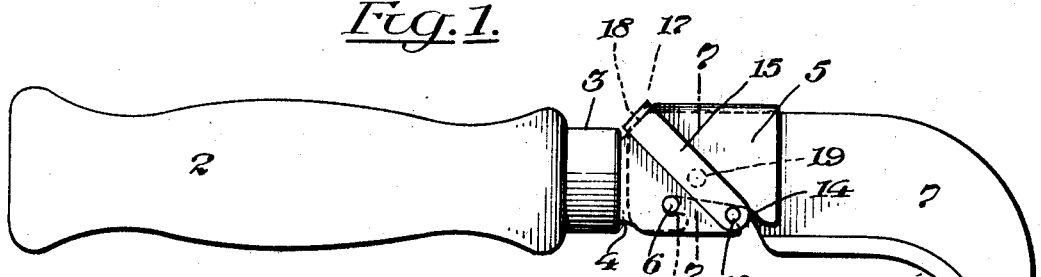
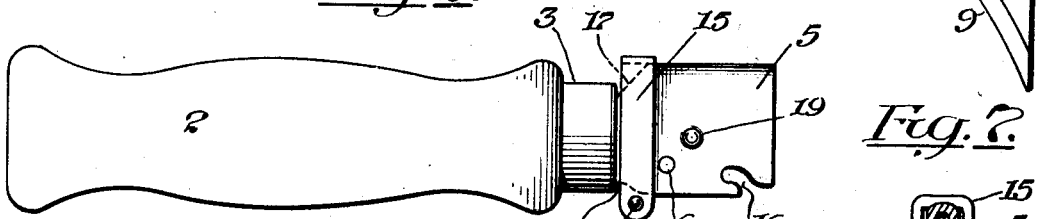
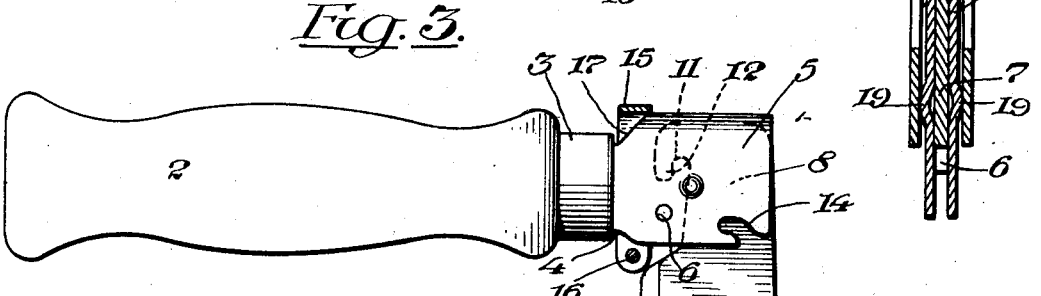
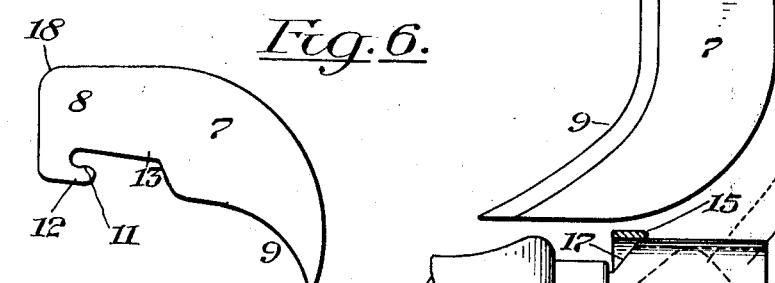
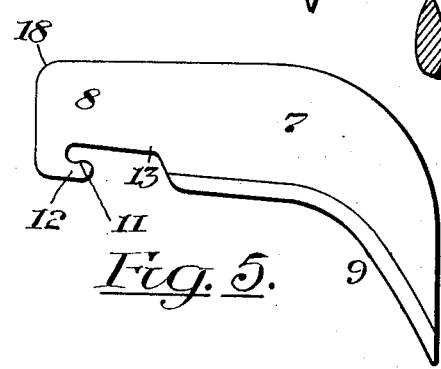
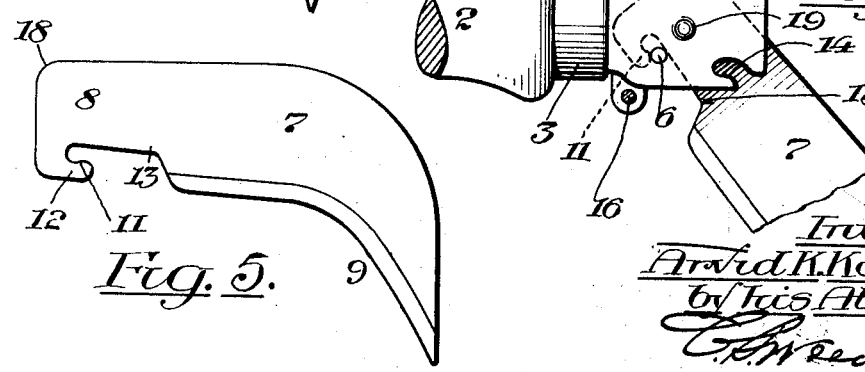
Inventor
Arvid K. Kosunen
by his Attorney Patented July 7, 1931

1,813,498

UNITED STATES PATENT OFFICE

ARVID K. KOSUNEN, OF JAMAICA, NEW YORK

CUTTING TOOL

Application filed June 27, 1929. Serial No. 374,046.

This invention relates to cutting tools, in the form of knives, particularly adapted for cutting heavy material such as linoleum, oilcloth, or rubber tiling, the object of the invention being to provide an improved instrument of this class having detachable and interchangeable cutting blades whereby the same handle may be used with different kinds and sizes of blades,—for instance, a blade suitable for cutting rubber tiling may be readily detached and a blade suitable for cutting linoleum or oil-cloth substituted,—and whereby also when the blades become dull, sharpened blades may be readily substituted without the necessity of stopping to resharpen the blade or purchase a new tool.

Another object of the present invention is the provision of an improved cutting tool of the class described in which the detachable blades may be readily inserted transversely to the handle and then swung into alignment with the handle and interlocked in position and efficiently clamped against movement in any direction.

A further object of this invention is the provision of an improved handle adapted for the reception of interchangeable, detachable blades and also the provision of improved blades adapted for attachment to such handle.

It is a well-known fact that in the use of cutting tools for cutting heavy material such as linoleum and rubber tiling, etc., the blades quickly become dull and thus have a comparatively short life, and, while they may be easily sharpened, this sharpening frequently takes the temper out of the blade so that the tool is of little practical use and consequently has to be discarded and an entire new tool substituted. Therefore, it is the object of the present invention to save the cost of frequent renewals or new tools by providing a tool in which the blades may be readily detached from the handle and similar blades readily used with the same handle and in which also blades adapted for different purposes may be used with the same handle, which tool is simple in construction, comparatively inexpensive to make, and in which the blades may be readily attached and detached with a minimum of effort and time and when so attached are held rigidly against play or movement whereby they are effective for the purposes designed.

In the drawings accompanying and forming a part of this specification—

Figure 1 illustrates this improved cutting tool with a blade attached;

Fig. 2 illustrates a view of the handle with the blade detached;

Fig. 3 illustrates the manner of inserting the blade;

Fig. 4 illustrates the manner in which the blade is swung into alignment with the handle and interlocked;

Fig. 5 is a view of a blade particularly adapted for use with linoleum;

Fig. 6 illustrates a blade particularly adapted for use with rubber tiling; and Fig. 7 is a cross-sectional view on line 7—7, Fig. 1.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings since the invention is capable of other embodiments and that the phraseology which I employ is for the purpose of description and not of limitation.

This improved cutting tool or knife comprises a handle 2 of any suitable form, the ferrule 3 of which carries the tang 4 of a suitable blade-holder 5 which, in the present instance, may be readily formed of sheet-metal bent upon itself to provide a pair of lapping sides spaced apart the thickness of the blade and open at its front edge and under edge. This blade-holding portion is provided with a pin or rivet 6 for connecting the sides thereof to hold them in tight engagement with the blade, which rivet also acts as a means for interlocking the blade in the holder. The blades 7, in the form shown, are provided with a shank portion 8 and a curved cutting portion 9 usually having a pointed end, and the shank portion is notched at one edge thereof, as at 11, to provide a locking tongue 12 projecting toward the forward end of the blade, which notch merges into a recess 13. The holder is provided with a similarly-formed tongue-forming notch 14 at the under edge thereof near the front. In attaching the blade it is slipped into the holder so as to project transversely, or at right angles thereto, and pushed back in the holder as far as it will go, in the manner shown in Fig. 3. The blade is then swung into alignment with the handle so as to carry the tongue of the blade and thereby the notch formed thereby into engagement with the rivet of the holder, thereby interlocking the blade with the holder against detachment. The recess of the blade is of such length that it registers with the tongue-forming notch 14 of the holder when the blade is in its proper position, which tongue 14 likewise projects toward the front end of the holder in a similar manner to the tongue of the blade. For the purpose of preventing the swinging of the blade in its holder after it is interlocked with the rivet, a slippable clamping member or band 15 is carried by the holder and comprises a member bent upon itself and having its free ends connected by a suitable pin or rivet 16, and when the blade is in position in the holder this clamping band is slipped forward to have the rivet engage the notch in the holder and the recess in the blade and the opposite end thereof is then swung backward to project over an inclined open edge 17 of the holder, which edge is so formed as to permit a corner 18 of the knife blade to project therethrough so that when this clamping band is swung into position it will engage this projecting corner of the knife blade and not only force the blade tightly in engagement with the rivet of the holder and with the rivet of the clamping band, but will also prevent wear on this part of the holder since the wear of the clamping band will come on the corner of the knife blade instead of on the holder. Thus, by this simple fastening means, the blade is not only held against swinging movement, but is also held tightly clamped against movement in any direction. In practice the holder is provided with a pair of bulges 19 at its sides whereby when the clamping band is properly positioned, the sides of the holder will also be tightly clamped against the sides of the blade.

Thus, by the present improvement, it will be observed that by releasing the clamping band so as to slip it out of the notch of the holder and move it backward on the holder, the blade can be swung transversely of its holder and readily released from the rivet of the holder and detached, thereby permitting a sharpened blade to be substituted for the dull blade or permitting a blade of a different size or shape or one more particularly adapted for a different purpose substituted therefor, which interchangeable and detachable blades can thus be used with the same holder without the necessity of renewal of the handle. Thus, by this simple improvement, blades of various kinds, shapes, or sizes may be readily attached and detached when they become broken or worn or dull and readily interlocked in position in a simple and expeditious manner by a clamping member always in position for this purpose and not readily lost as would be screws, or bolts commonly used to secure detachable blades in position.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A cutting tool comprising a handle and a detachable blade, said handle and blade having means for interlocking them by the insertion of the blade transversely to the handle and swinging it into alinement with the handle and also having registering recesses at the edges of the handle and blade and a shiftable member for engaging both of said registered recesses for clamping the blade against movement.

2. A cutting tool comprising a handle and a detachable blade, said handle and blade having means for interlocking them by the insertion of the blade transversely to the handle and swinging it into alinement with the handle, and means shiftable into an oblique position for clamping the blade against swinging movement.

3. A cutting tool comprising a handle and a detachable blade, said handle and blade having means for interlocking them by the insertion of the blade transversely to the handle and swinging it into alinement with the handle and also having registering recesses at the edges of the handle and blade, and means for clamping the blade against swinging movement and comprising a slidable clamping band for engaging both of said registered recesses.

4. A cutting tool comprising a handle and a detachable blade, said handle and blade having means for interlocking them by the insertion of the blade transversely to the handle and swinging it into alinement with the handle and said blade having a corner projecting through the handle, and means for clamping the blade against swinging movement and comprising a slidable clamping band shiftable into position to engage the under edge of the blade and the projecting corner of the blade.

5. A cutting tool comprising a handle and a detachable blade, means for interlocking said blade and handle on the swinging of the blade into alinement with the handle, means co-operating with the blade and handle for clamping the blade against movement and comprising a shiftable member, said member and handle having cooperating means, one hooked into the other and under an inner edge of the blade.

6. A cutting tool provided with a handle, a detachable blade interlocked therewith by inserting it transversely into the handle and swinging it into alinement with the handle, pin and notch means for effecting such interlocking, and means for securing the blade against swinging movement, said means and blade also having a co-operating pin and recess.

7. A cutting tool provided with a handle, a detachable blade interlocked therewith by inserting it transversely into the handle and swinging it into alinement with the handle, pin and notch means for effecting such interlocking and comprising a notched tongue carried by the blade and a pin carried by the handle, and means for securing the blade against movement and comprising a shiftable member, said member, handle, and blade also having cooperating pin and recess means.

8. A cutting tool provided with a handle, a detachable blade interlocked therewith by inserting it transversely into the handle and swinging it into alinement with the handle, pin and notch means for effecting such interlocking and comprising a notched tongue carried by the blade and a pin carried by the handle, and means for securing the blade against swinging movement and comprising a clamping member carried by the handle, said member, handle, and blade also having cooperating pin and recess means, the pin carried by the securing means and the recesses by the blade and handle.

9. A cutting tool provided with a handle, a detachable blade interlocked therewith by inserting it transversely into the handle and swinging it into alinement with the handle, pin and notch means for effecting such interlocking, and means for securing the blade against swinging movement and comprising a slippable clamping member carried by the handle and shiftable into an oblique position to engage obliquely opposite portions of the blade.

10. A cutting tool provided with a handle, a detachable blade interlocked therewith by inserting it transversely into the handle and swinging it into alinement with the handle, pin and notch means for effecting such interlocking, and means for securing the blade against swinging movement and comprising a slippable clamping member carried by the handle and having a transverse pin in position to engage the handle under an inner edge of the blade at a point on that side of the pivot remote from the handle.

11. A cutting tool comprising a handle having a blade-holder comprising a pair of spaced members riveted together and provided with a tongue-forming notch, a detachable cutting blade having a tongue-forming recess and attachable by inserting it transversely relatively to the handle and swinging it to have the tongue of the blade engage the rivet of the holder, and means carried by the holder for engaging the recess of the blade and notch of the holder for clamping the blade against movement in any direction.

12. A cutting tool comprising a handle having a blade-holder comprising a pair of spaced members riveted together and provided with a tongue-forming notch, a detachable cutting blade having a tongue-forming recess and attachable by inserting it transversely relatively to the handle and swinging it to have the tongue of the blade engage the rivet of the holder, and means carried by the holder for engaging the recess of the blade for clamping the blade against movement in any direction, said clamping means comprising a band having a rivet adapted to engage in the tongue-forming notch of the holder.

13. A cutting tool comprising a handle having a blade-holder comprising a pair of spaced members riveted together and provided with a tongue-forming notch, a detachable cutting blade having a tongue-forming recess and attachable by inserting it transversely relatively to the handle and swinging it to have the tongue of the blade engage the rivet of the holder, and means carried by the holder for engaging the recess of the blade for clamping the blade against movement in any direction, said clamping means comprising a band having a rivet adapted to engage in the tongue-forming notch of the holder, said holder also having an open inclined corner for the projection of the corner of the blade, and said clamping band being swingable into position to engage the projecting corner of the blade.

14. A cutting tool comprising a handle, a bent, riveted and spaced blade-holder carried thereby and having a notch-forming tongue, said holder being open at its front and one longitudinal edge and also having an open inclined rear corner, an interchangeable and detachable blade having a recessed and notch-forming tongue adapted for insertion into the holder transversely to the handle and swingable therein to have its tongue engage the rivet of the holder, and a clamping member having a rivet adapted to engage the notched tongue of the holder and in the recess of the blade and slippable into an inclined position to engage the inclined corner of the holder and the corner of the blade, thereby to clamp the blade against movement in any direction, said holder also having a projection on its side for engagement with the clamping member.

15. A cutting tool comprising a handle for the reception of a blade and having a blade-holding member carried thereby at one end and comprising a pair of spaced members open at one end and one side and riveted together and provided with a notch-forming tongue located at the under edge of the blade-holding member.

16. A cutting tool comprising a handle for the reception of a blade and having a blade-holding member carried thereby at one end and comprising a pair of spaced members open at one end and one side and riveted together and provided with a notch-forming tongue and also provided with an inclined open rear corner.

17. A cutting tool provided with a handle, a detachable blade interlocked therewith by inserting it transversely into the handle and swinging it into alinement with the handle, pin and notch means for effecting such interlocking, said handle and blade also having a pair of registering recesses at their edges, and means for securing the blade against swinging movement and comprising a slippable clamping member carried by the handle and shiftable into an oblique position to engage into said registered recesses and obliquely engage opposite portions of the blade.

Signed at Rooms 1822-3-4, 15 Park Row, New York, N. Y., this 15th day of June, 1929

ARVID K. KOSUNEN.